(12) United States Patent
Lien et al.

(10) Patent No.: US 9,500,313 B2
(45) Date of Patent: Nov. 22, 2016

(54) SUPPORT FOR DISPLAY (71) Applicant: ShenZhen Treasure City Technology Co., LTD., ShenZhen (CN)

(72) Inventors: Chih-Huang Lien, Hsinchu (TW);
Chen-Jung Fang, New Taipei (TW);
Hui-Ting Shen, Hsinchu (TW);
Chin-Chou Lin, Hsinchu (TW)

(73) Assignee: ShenZhen Treasure City Technology Co., LTD., ShenZhen (CN)

( * ) Notice: Subject to any disclaimer, the term of this patent is extended or adjusted under 35 U.S.C. 154(b) by 242 days.

(21) Appl. No.: 14/484,219

(22) Filed: Sep. 11, 2014

(65) Prior Publication Data

US 2015/0068799 A1  Mar. 12, 2015

(30) Foreign Application Priority Data

Sep. 11, 2013 (TW) .............. 102132805 A (51) Int. Cl.
*H02G 3/30* (2006.01)
*H02G 5/04* (2006.01)
*F16M 13/02* (2006.01)
*F16M 11/42* (2006.01)
*F16M 11/10* (2006.01)
*F16M 11/20* (2006.01)

(52) U.S. Cl.
CPC .......... *F16M 11/425* (2013.01); *F16M 11/105* (2013.01); *F16M 11/2085* (2013.01); *F16M 13/02* (2013.01)

(58) Field of Classification Search
CPC ........... H02G 3/30; H02G 5/04; H02G 5/06;
H05K 5/00; H05K 5/12; H05K 5/0247;
H05K 5/0017; H05K 5/0221; F16M 13/022;
F16M 13/02; F16M 11/105; F16M 11/2085;
F16M 11/00; F16M 11/04; F16M 11/425;
F16M 11/10; F16M 11/126; F16M 11/18
USPC ....... 174/503, 70 B, 480, 481, 535, 542, 58, 174/70 C, 135; 248/906, 200, 125.7, 125.9, 248/121
See application file for complete search history.

(56) References Cited

U.S. PATENT DOCUMENTS

| | | | | |
|---|---|---|---|---|
| 7,410,138 B2* | 8/2008 | Parsons | ................... | F16M 11/04 248/125.7 |
| 8,201,782 B2* | 6/2012 | Fan | ........................ | F16M 11/10 248/125.8 |
| 8,254,092 B2* | 8/2012 | Russell | ................... | F16M 11/10 248/125.7 |
| 8,827,226 B2* | 9/2014 | Townsend | ............... | F16M 11/10 248/231.91 |
| 9,027,893 B2* | 5/2015 | Cheng | .................... | F16M 11/18 248/201 |
| 9,316,346 B2* | 4/2016 | Lau | ...................... | F16M 11/126 |

\* cited by examiner

*Primary Examiner* — Angel R Estrada
(74) *Attorney, Agent, or Firm* — Zhigang Ma (57) ABSTRACT

A support for a display which allows for the safe supply of electrical power when the display is reoriented includes a mounting board for mounting a display and a rack. The rack includes a power port and a power rail electrically connected to the power port. A slip assembly is slidable mounted on the rack. The mounting board is secured on the slip assembly. The slip assembly includes a conduction piece which is electrically connected to a display. The conduction piece is in electrical contact with different portions of the power rail when the slip assembly slides on the rack.

20 Claims, 8 Drawing Sheets

SUPPORT FOR DISPLAY

CROSS-REFERENCE TO RELATED APPLICATIONS

This application claims priority to Taiwanese Patent Application No. 102132805 filed on Sep. 11, 2013 in the Taiwan Intellectual Property Office, the contents of which are incorporated by reference herein.

FIELD

The subject matter herein generally relates to a support for a display.

BACKGROUND

A large television is often secured on a wall by a support. Some televisions can slide on the supporter to adjust a position of the television. A power line of the television may be wrapped on the support.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Figure 1:
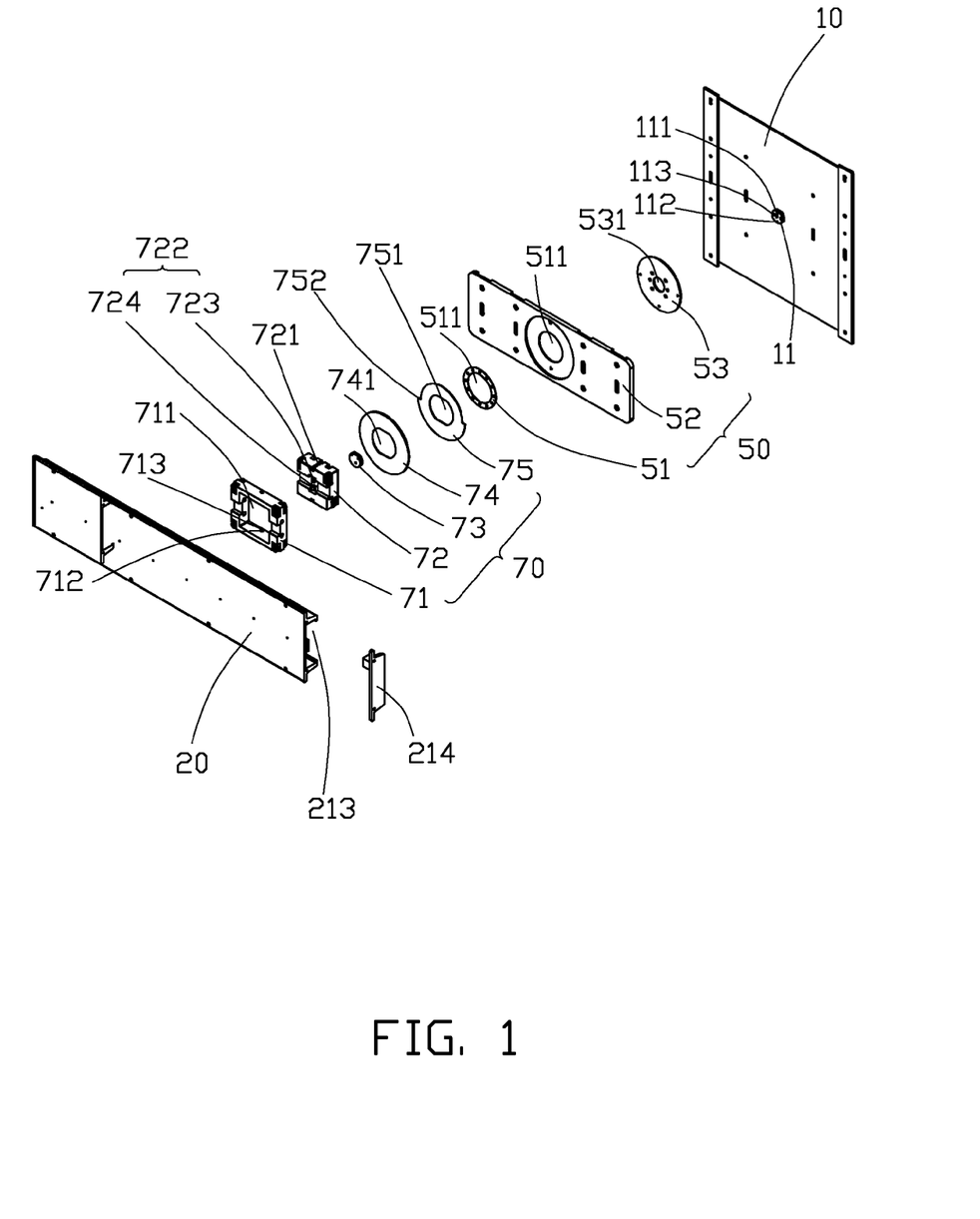
FIG. 1 is an exploded, isometric view of an embodiment of a support of a display.
Figure 2:
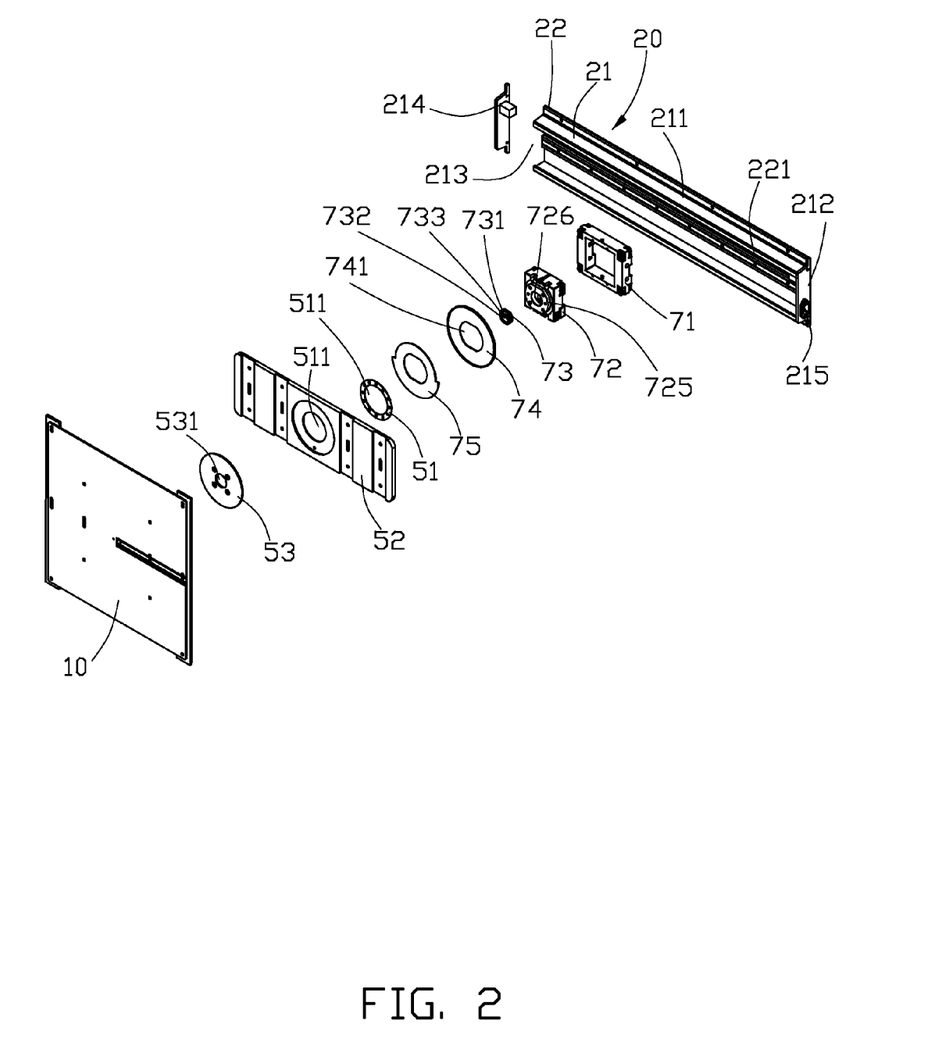
FIG. 2 is similar to FIG. 1, but viewed from a different angle.

FIGS. 1-2 illustrate a support for a display in accordance with an embodiment. The support includes a mounting board 10, a rack 20, a rotation assembly 50, and a slip assembly 70.

Figure 3:
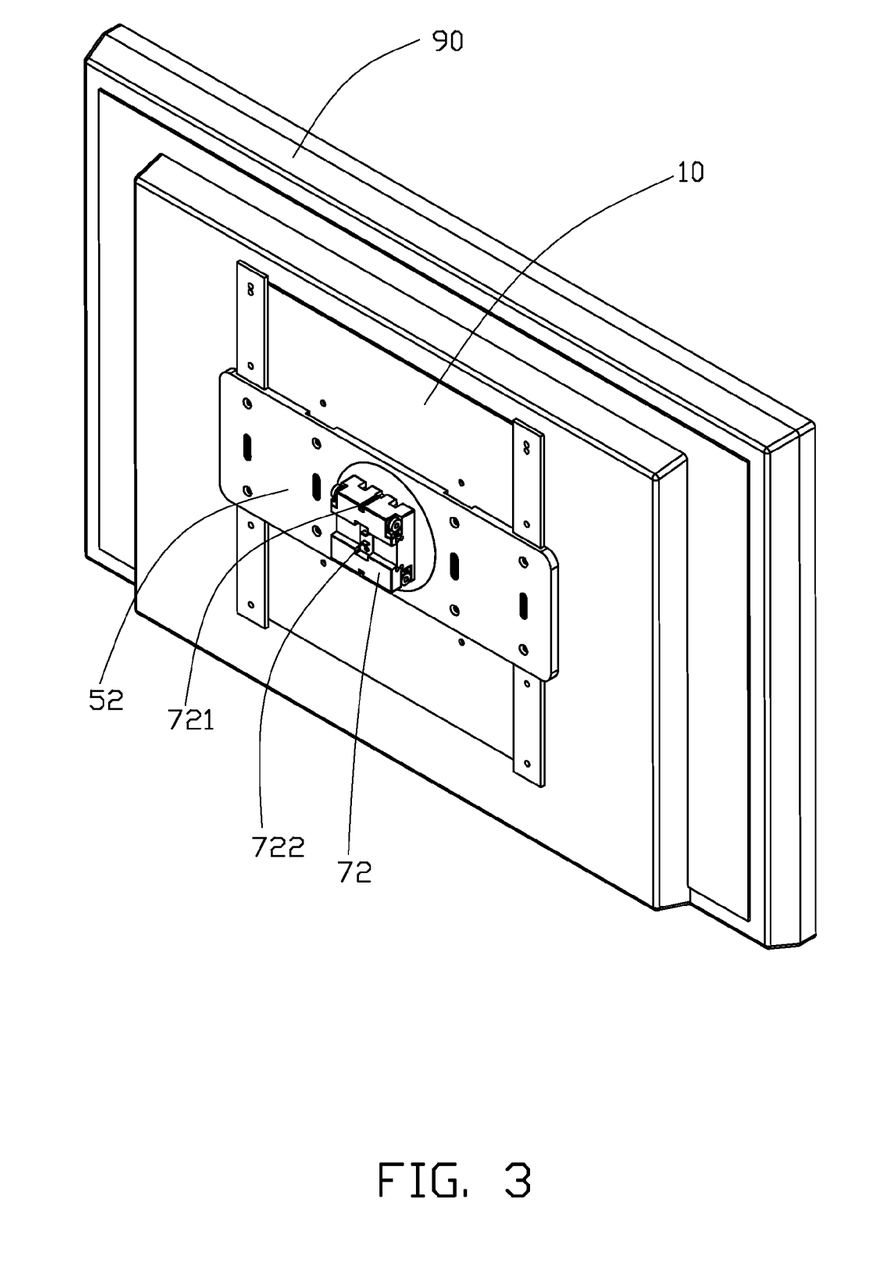
FIG. 3 is a partially assembled isometric view of the support of FIG. 1 and a displayer.
Figure 4:
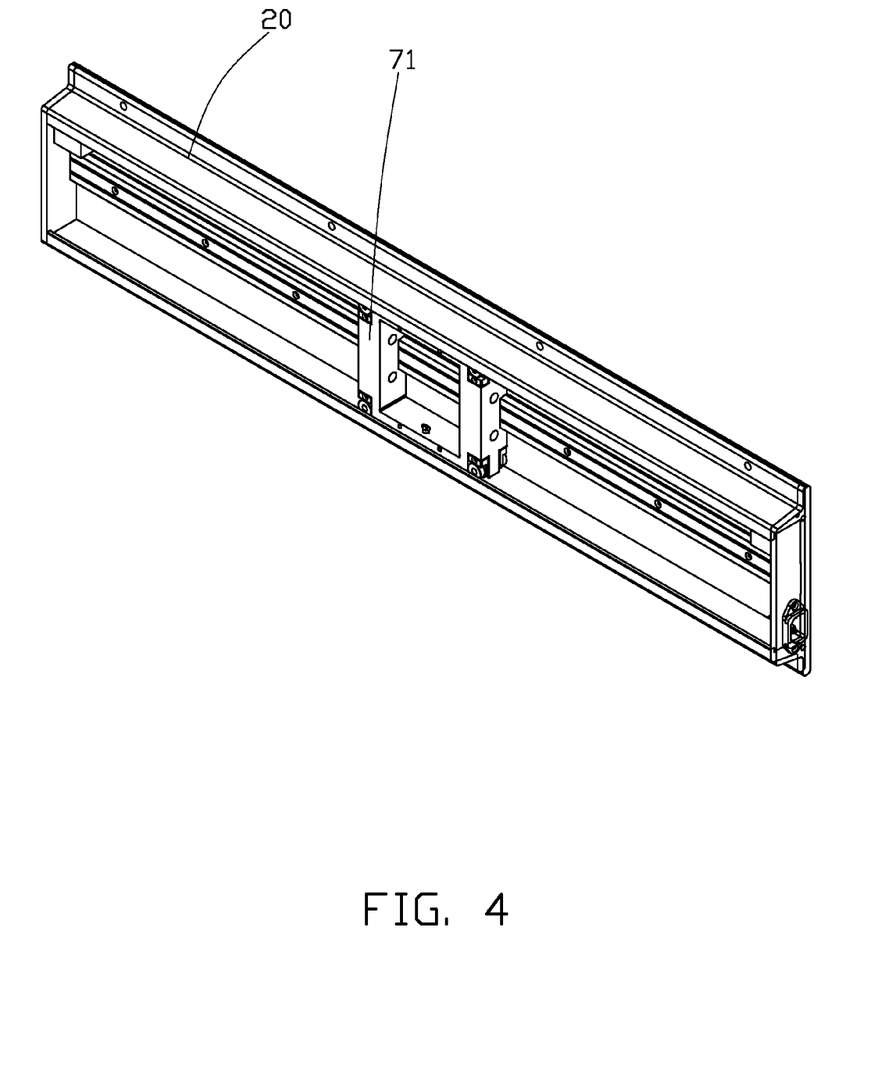
FIG. 4 is another partially assembled isometric view of the support of FIG. 1.
Figure 5:
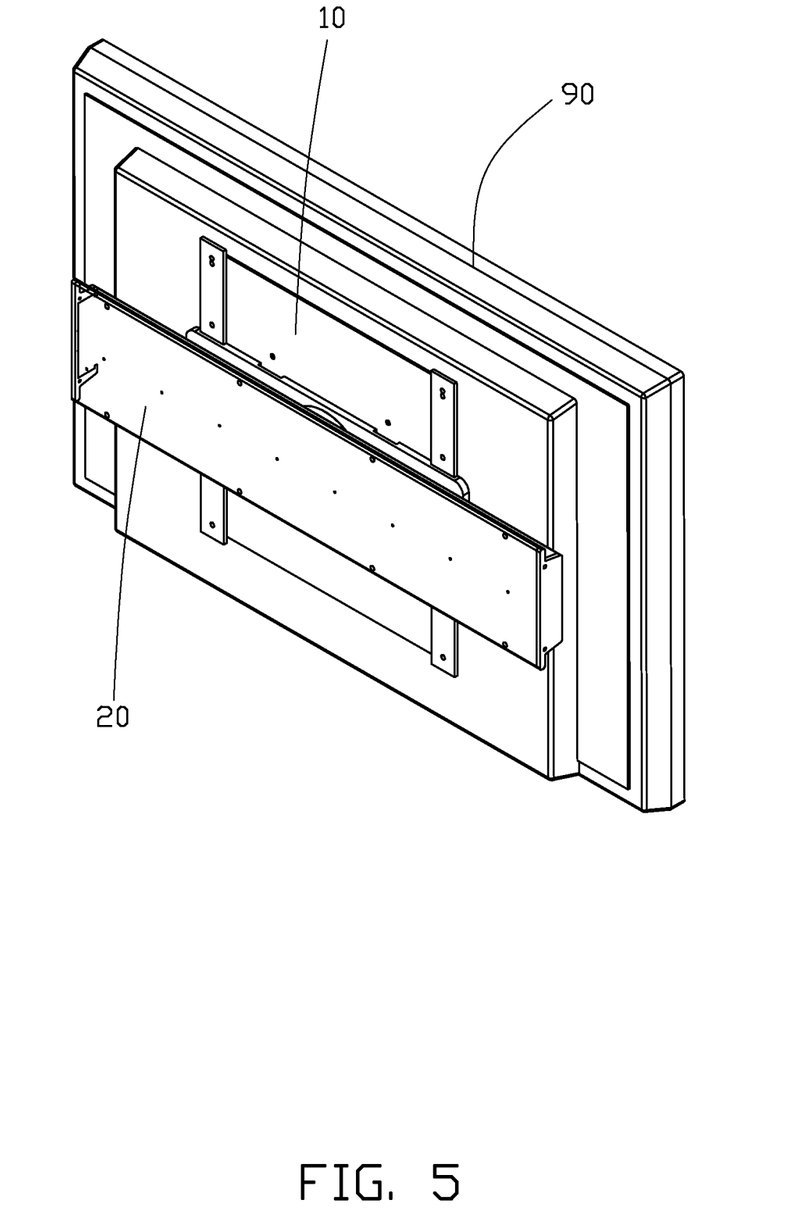
FIG. 5 is an assembled isometric view of the support of FIG. 1 and a displayer.
Figure 6:
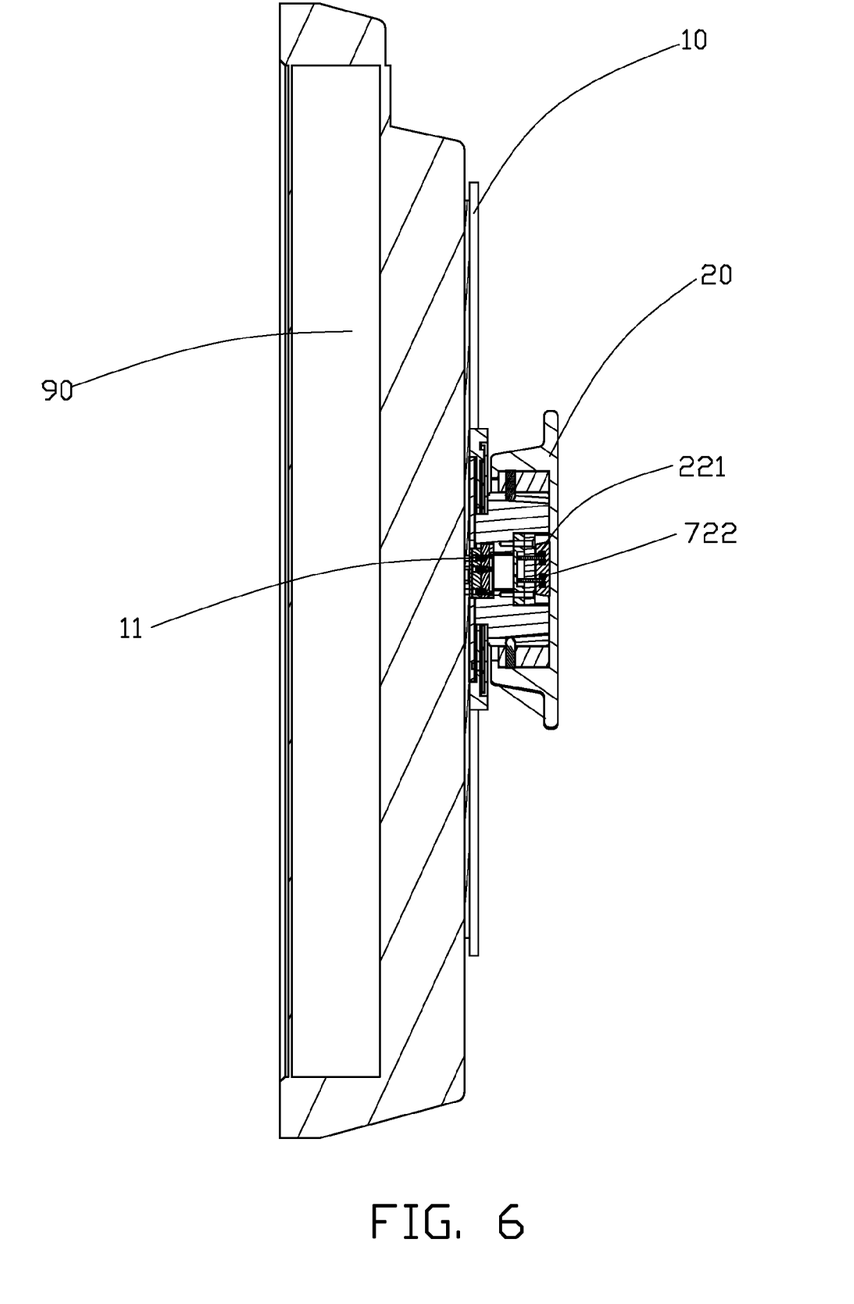
FIG. 6 is a sectional view of the support and the displayer of FIG. 5.
Figure 7:
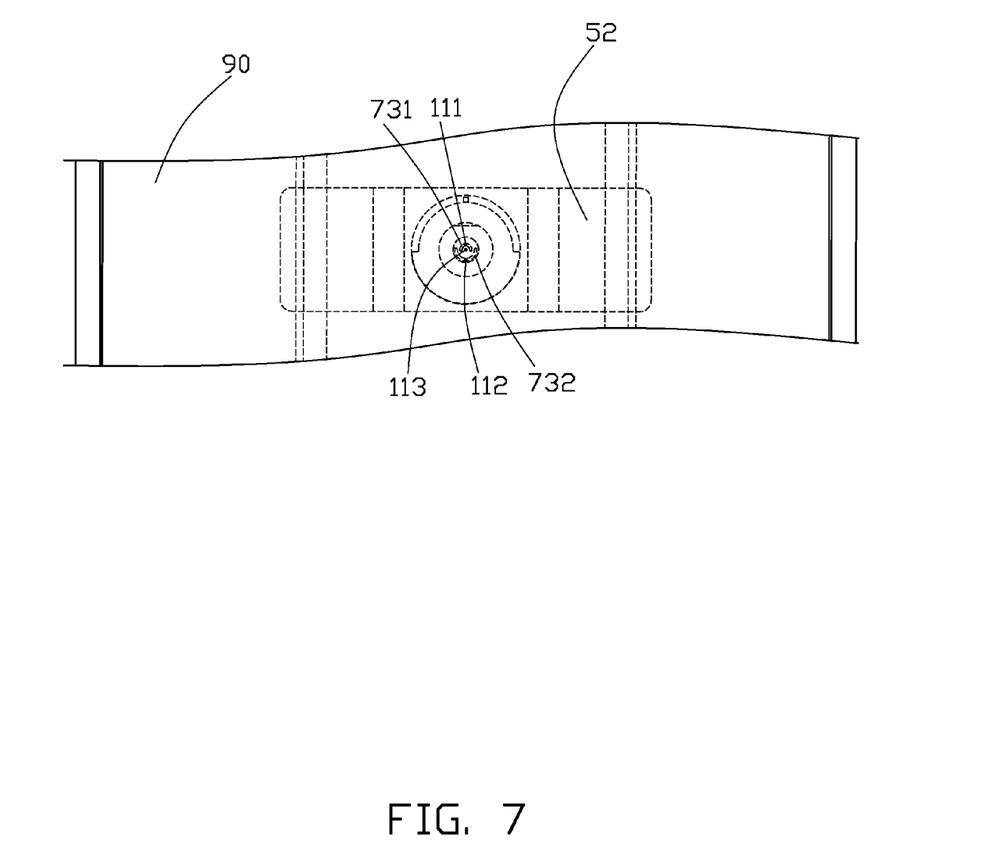
FIG. 7 is a rear view of the support and the displayer of FIG. 5.

The mounting board 10 can be mounted on a display 90 (referring to FIG. 3). The mounting board 10 includes a power connector 11. The power connector 11 includes three power transmitting posts, being a first power transmitting post 111, a second power transmitting post 112, and a third power transmitting post 113. The first power transmitting post 111 is located above the third power transmitting post 113, and the second power transmitting post 112 is located below the third power transmitting post 113. The three power transmitting posts, 111, 112, and 113, can be electrically connected to the display 90 to transmit power to the display 90 when the mounting board 10 is mounted on a display 90.

The rack 20 can be mounted on a wall. The rack 20 includes a frame 21 and a bottom plate 22 mounted on the frame 21. The frame 21 includes two parallel long edges 211 and a short edge 212 connected between the two long edges 211. The frame 21 defines an opening 213. A cover 214 can be mounted on the frame 21 to close the opening 213. A power port 215 is mounted on the short edge 212. Two parallel and exposed rails 221 are mounted on the bottom plate 22. In at least one embodiment, the two parallel rails 221 are a null line and a live line which are connected to the power port 215. The two parallel bare rails 221 are parallel to the two long edges 211.

The slip assembly 70 includes a first slip block 71, a second slip block 72, a conduction block 73, a gasket 74, and a restricting piece 75.

The first slip block 71 defines a substantially square receiving hole 711. Each of a top edge and a bottom edge surrounding the receiving hole 711 forms a slip post 712. A distal end of the slip post 712 includes a restricting portion 713. The first slip block 71 can slide between the pair of long edges 211 via the opening 213.

The second slip block 72 can be slidably mounted in the receiving hole 711. Each of a top side and a bottom side of the second slip block 72 forms a sliding groove 721. The second slip block 72 includes conduction pieces 722 which face to the first slip block 71. The conduction pieces 722 includes a first conduction piece 723 and a second conduction piece 724. The second slip block 72 includes a mounting block 725 which faces away from the first slip block 71. The mounting block 725 is non-circular. The mounting block 725 defines an accommodation hole 726.

The conduction block 73 can be accommodated in the accommodation hole 726. The conduction block 73 defines a first conduction groove 731, a second conduction groove 732, and a conduction hole 733. The first conduction groove 731 and the second conduction groove 732 are arc shaped. The first conduction groove 731 is located above the conduction hole 733, and the second conduction groove 732 is located below the conduction hole 733. The exposed surfaces of the first conduction groove 731, the second conduction groove 732, and the conduction hole 733 are coated with electrically conductive materials. After the conduction block 73 is received in the accommodation hole 726 of the second slip block 72, the first conduction piece 723 is in electrical contact with the first conduction groove 731, the second conduction piece 724 is in electrical contact with the second conduction groove 732, and the conduction hole 733 is connected to ground.

The gasket 74 defines a mounting hole 741 to receive the mounting block 725. The restricting piece 75 defines a through hole 751 to received the mounting block 725. The restricting piece 75 comprises bars 752. In one embodiment, the restricting piece 75 is made of high-friction material.

The rotation assembly 50 includes a friction piece 51, a securing piece 52, and fixing piece 53. The friction piece 51 and the securing piece 52 together define a rotation hole 511.

The mounting block 725 of the second slip block 72 can rotate in the rotation hole 511. The fixing piece 53 can be mounted on the securing piece 52. The fixing piece 53 defines an inserting hole 531 for receiving the power connector 11 of the mounting board 10.

Referring to FIGS. 1-8, in assembly, the conduction block 73 is mounted in the accommodating hole 726 of the second slip block 72. The second slip block 72 is then mounted in the receiving hole 711 of the first slip block 71, with the slip post 712 sliding in the sliding groove 721. Then, the first slip block 71 slides in the rack 20 with the first conduction piece 723 and the second conduction piece 724 electrically connected to the two rails 221.

The mounting block 725 of the second slip block 72 is inserted in the mounting hole 741 and the through hole 751 to locate the gasket 74 and the restricting piece 75 on the mounting block 725. The friction piece 51 is mounted on one side of the securing piece 52, and the fixing piece 53 is mounted on another side of the securing piece 52. The securing piece 52 is mounted on the mounting board 10. The power connector 11 is inserted through the inserting hole 531.

The mounting block 725 is inserted in the rotation holes 511 of the friction piece 51 and the securing piece 52. The friction piece 51 abuts the restricting piece 75. At the same time, the first power transmitting post 111 is inserted in the first conduction groove 731 and electrically connected to the first conduction groove 731. The second power transmitting post 112 is inserted in the second conduction groove 732 and electrically connected to the second conduction groove 732, and the third power transmitting post 113 is inserted in the conduction hole 733 and electrically connected to the conduction hole 733.

To use the support, the rack is mounted on a wall, a power source is electrically connected to the power port 215. Electricity can thus be transmitted to the display 90 via the power port 215, the rails 221, the conduction pieces 722, the conduction block 73, and the power connector 11.

When the display 90 needs to slide, the second slip block 72 slides to disengage the conduction pieces 721 from the rails 221. Then, the first slip block 71 slides in the rack to slide the display 90 to a new position, and the second slip block 72 slides backwardly to re-engage the the conduction pieces 721 with the rails 221.

Figure 8:
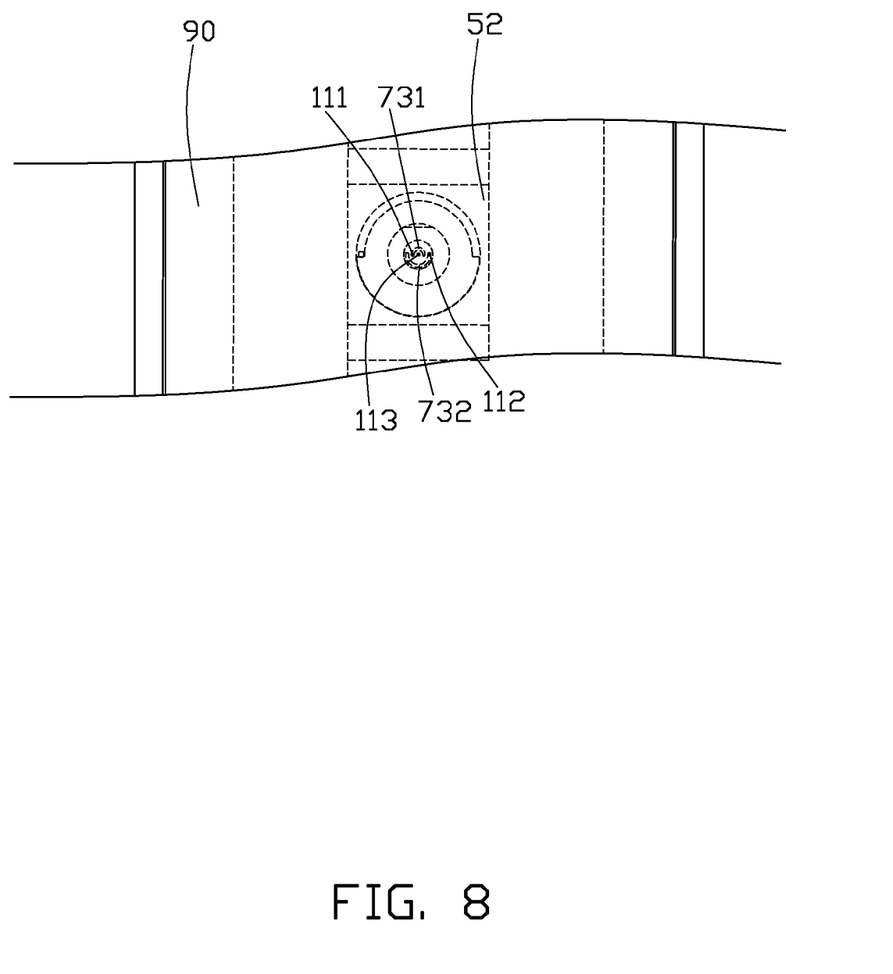
FIG. 8 is another rear view of the support and the displayer of FIG. 5, the displayer having rotated.

When the display 90 is rotated, the rotation assembly 50 and the mounting board 10 rotate together with the display 90. A friction force is generated between the friction piece 51 and the restricting piece 75 to hold the display 90 in any position. Simultaneously, the first power transmitting post 111 slides in the first conduction groove 731 and is kept in electrical contact with the first conduction groove 731, the second power transmitting post 112 slides in the second conduction groove 732 and is kept in electrical contact with the second conduction groove 732, and the third power transmitting post 113 rotates in the conduction hole 733 and is kept in electrical contact with the conduction hole 733. Therefore, electrical power supplied to the display 90 is maintained.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A support for a display, comprising:
   a mounting board for mounting a display;
   a rack comprising a power port, a bare rail electrically connected to the power port; and
   a slip assembly slidable mounted on the rack, the mounting board secured on the slip assembly, the slip assembly comprising a conduction piece which is configured to electrically connected to a display, and the conduction piece configured to be electrically contacted with different portions of the rail when the slip assembly slides on the rack.

2. The support of claim 1, wherein the slip assembly comprises a first slip block and a second slip block, the conduction piece is mounted on the second slip block, the first slip block is configured to slide on the rack along a first direction, and the second slip block is configured to move in the first slip block in a second direction, which is perpendicular to the first direction, to contact the conduction piece with the rail.

3. The support of claim 2, wherein the first slip block defines a receiving hole, a slip post is formed on a boundary of the receiving hole, the second slip block defines a sliding groove, and the second slip block is received in the receiving hole with the slip post sliding in the sliding groove.

4. The support of claim 1, wherein the mounting board is rotatable mounted on the slip assembly via a rotation assembly.

5. The support of claim 4, wherein the rotation assembly comprises a friction piece, the slip assembly comprises a restricting piece, the friction piece abuts the restricting piece, and a friction force is generated between the friction piece and the restricting piece when the rotation assembly rotates.

6. The support of claim 4, wherein the rotation assembly defines a first conduction groove, a bound of the first conduction groove is coasted with conduction material, the bound of the first conduction groove is electrically connected to the conduction piece, the mounting board comprises a first power transmitting post, the first power transmitting post is inserted in the first conduction groove and electrically connected to the bound of the first conduction groove, and the first power transmitting post is configured to slide in the first conduction groove to be kept to electrically connect the bound of the first conduction groove.

7. The support of claim 4, wherein the first conduction groove is shaped in an arc.

8. A support for a display, comprising:
   a rack defining a first conduction groove which is configured to connect a power source;
   and a mounting board for mounting a display, the mounting board rotatable mounted on the rack via a rotation assembly, the mounting board comprising a first power transmitting post which is inserted in the first conduction groove;
   wherein the first power transmitting post is configured to slide in the first conduction groove to be kept to electrically connect the first conduction groove when the mounting board is mounted on the rack.

9. The support of claim 8, wherein a bound of the first conduction groove is coasted with conduction material.

10. The support of claim 8, wherein the first conduction groove is shaped in an arc.

11. The support of claim 8, wherein a slip assembly is slidable mounted on the rack, and the rotation assembly is rotatable mounted on the slip assembly.

12. The support of claim 11, wherein the rack comprising a power port, a bare rail is electrically connected to the power port, the slip assembly comprises a conduction piece which is electrically connected to the first conduction groove, and the conduction piece is configured to be electrically contacted with different portions of the rail when the slip assembly slides on the rack.

13. The support of claim 12, wherein the slip assembly comprises a first slip block and a second slip block, the conduction piece is mounted on the second slip block, the first slip block is configured to slide on the rack along a first direction, and the second slip block is configured to move in the first slip block in a second direction, which is perpendicular to the first direction, to contact the conduction piece with the rail.

14. The support of claim 13, wherein the first slip block defines a receiving hole, a slip post is formed on a boundary of the receiving hole, the second slip block defines a sliding groove, and the second slip block is received in the receiving hole with the slip post sliding in the sliding groove.

15. A wall mountable support for a display unit, comprising:
a mounting plate attachable to the display unit;
a rack attachable to the wall; and
a slip assembly attached to the mounting plate and slidably secured to the rack;
wherein, the rack comprises a power port connectable to an outside source and one or more rails conductively connected to the power port; and
wherein, the slip assembly is in slidable and conductive contact with at least one of the one or more conductively connected rack rails, and the slide assembly is conductively connectable to the display unit.

16. The wall mountable support of claim 15, wherein the slip assembly comprises a first slip block and a second slip block, a conduction piece is mounted on the second slip block, the first slip block is configured to slide on the rack along a first direction, and the second slip block is configured to move in the first slip block in a second direction, which is perpendicular to the first direction, to contact the conduction piece with the rail.

17. The wall mountable support of claim 15, wherein the first slip block defines a receiving hole, a slip post is formed on a boundary of the receiving hole, the second slip block defines a sliding groove, and the second slip block is received in the receiving hole with the slip post sliding in the sliding groove.

18. The wall mountable support of claim 15, wherein the mounting plate is rotatable mounted on the slip assembly via a rotation assembly.

19. The wall mountable support of claim 18, wherein the rotation assembly comprises a friction piece, the slip assembly comprises a restricting piece, the friction piece abuts the restricting piece, and a friction force is generated between the friction piece and the restricting piece when the rotation assembly rotates.

20. The wall mountable support of claim 19, wherein the rotation assembly defines a first conduction groove, a bound of the first conduction groove is coasted with conduction material, the bound of the first conduction groove is electrically connected to the slip assembly, the mounting board comprises a first power transmitting post, the first power transmitting post is inserted in the first conduction groove and electrically connected to the bound of the first conduction groove, and the first power transmitting post is configured to slide in the first conduction groove to be kept to electrically connect the bound of the first conduction groove.

* * * * *